(12) United States Patent
Yoshikawa

(10) Patent No.: US 6,487,475 B1
(45) Date of Patent: *Nov. 26, 2002

(54) DRIVING STATE MONITORING APPARATUS FOR VEHICLES

(75) Inventor: Kenji Yoshikawa, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/679,418

(22) Filed: Oct. 4, 2000

(30) Foreign Application Priority Data

Dec. 1, 1999 (JP) .......................... 11-342384

(51) Int. Cl.[7] .............................................. G06F 17/00
(52) U.S. Cl. ................................. 701/1; 701/36; 701/41; 701/65; 340/439
(58) Field of Search ........................ 701/1, 29, 36, 701/65, 41, 42; 340/436, 438, 439, 576, 575

(56) References Cited

U.S. PATENT DOCUMENTS

| | | | | |
|---|---|---|---|---|
| 5,991,675 A | * | 11/1999 | Asanuma | 701/41 |
| 6,182,000 B1 | * | 1/2001 | Ohta et al. | 701/55 |
| 6,199,001 B1 | * | 3/2001 | Ohta et al. | 701/51 |
| 6,269,307 B1 | * | 7/2001 | Shinmura et al. | 701/301 |
| 6,278,362 B1 | * | 8/2001 | Yoshikawa et al. | 340/439 |
| 2001/0003436 A1 | * | 6/2001 | Yoshikawa | 340/439 |

FOREIGN PATENT DOCUMENTS

| | | |
|---|---|---|
| JP | 5-85221 | 4/1993 |
| JP | 8-249600 | 9/1996 |

* cited by examiner

Primary Examiner—Jacques H. Louis-Jacques
(74) Attorney, Agent, or Firm—Arent Fox Kintner Plotkin & Kahn, PLLC (57) ABSTRACT

A driving state monitoring apparatus for a vehicle, for monitoring the driving state of the driver of the vehicle is disclosed. A behavior parameter indicative of an amount of lateral movement of the vehicle and the speed of the vehicle is detected. A simple regression line is obtained according to changes in the behavior parameter and the simple regression line is set as a behavior reference. A lateral deviation behavior quantity of the vehicle is calculated according to the behavior parameter, the behavior reference, and the vehicle speed. It is determined according to the lateral deviation behavior quantity whether or not the driving state of the driver is proper. The shape of a road on which the vehicle is running is determined. When the road shape is determined to be substantially straight or curved with a substantially constant radius of curvature, and the driving state of the driver is not determined to be proper, it is determined that the driving state of the driver is abnormal.

8 Claims, 9 Drawing Sheets

YA, YAR

FIG. 3C

YAW

FIG. 3D

LOC

DRIVING STATE MONITORING APPARATUS FOR VEHICLES

BACKGROUND OF THE INVENTION

The present invention relates to a driving state monitoring apparatus for vehicles, which monitors a driving state of the driver of the vehicle and issuing an alarm as required.

A driving state monitoring apparatus is known which has means for estimating the response delay time of the driver and the deviation between a vehicle position and the running lane according to the amount of steering of the vehicle and the vehicle speed, means for comparing the estimated response delay time of the driver and the estimated deviation with a response delay time and a deviation in a normal condition, respectively, and means for determining the driving state of the driver (e.g., an abnormal steering caused by a lowered driving ability due to dozing or fatigue of the driver) (Japanese Patent Laid-open No. Hei 5-85221).

Also known is a driving state monitoring apparatus having means for detecting the yaw rate and the vehicle speed, means for obtaining a reference line for running of the vehicle according to the detected yaw rate and the detected vehicle speed, and means for determining abnormality of the driving state of the driver by using a parameter indicative of the deviation between an actual running locus and the reference line (Japanese Patent Laid-open No. Hei 8-249600).

However, in the above-mentioned conventional monitoring apparatus described in Japanese Patent Laid-open No. Hei 5-85221, the deviation between the actual vehicle position and the running lane (reference vehicle position) is calculated according to the amount of steering and the vehicle speed, but not according to a physical quantity relating directly to vehicle behavior. Accordingly, an error in this deviation can be produced due to changes in vehicle characteristics (e.g., characteristics of the vehicle suspension or the steering device), causing a reduction in accuracy of determination of the driver's driving state.

On the other hand, in the monitoring apparatus described in Japanese Patent Laid-open No. Hei 8-249600, the driving state is determined by using the yaw rate relating directly to vehicle behavior, thereby improving the determination accuracy. However, the quantity of computation for the calculation of the reference line as a determination reference is large, so that a microcomputer dedicated solely to the monitoring of the driving state is required. Accordingly, it is difficult to reduce the number of microcomputers used in the monitoring apparatus for the purpose of cost reduction.

SUMMARY OF THE INVENTION

It is accordingly an object of the present invention to provide a driving state monitoring apparatus which can precisely grasp the behavior of a vehicle with a smaller quantity of calculations as compared with the prior art, thereby effecting precise determination of the driving state.

In accordance with the present invention, there is provided a driving state monitoring apparatus for a vehicle, for monitoring the driving state of a driver of the vehicle, comprising: behavior parameter detecting means for detecting a behavior parameter indicative of a quantity of lateral movement of the vehicle; vehicle speed detecting means for detecting the speed of the vehicle; behavior reference setting means for obtaining a simple regression line according to changes in the behavior parameter and setting the simple regression line as a behavior reference; lateral deviation behavior quantity calculating means for calculating the lateral deviation behavior quantity of the vehicle according to the behavior parameter, the behavior reference, and the vehicle speed; driving state determining means for determining whether or not the driving state of the driver is proper according to the lateral deviation behavior quantity; and road shape determining means for determining the shape of a road on which the vehicle is running; wherein when the road shape determining means determines that the road is substantially straight or curved with a substantially constant radius of curvature, and the driving state determining means determines that the driving state of the driver is not proper, it is determined that the driving state of the driver is abnormal.

With this arrangement, a simple regression line is obtained according to changes in behavior parameters indicative of lateral movement of the vehicle, and this simple regression line is set as a behavior reference. Further, a lateral deviation behavior quantity of the vehicle is calculated according to the behavior parameter, the behavior reference, and the vehicle speed. Then, it is determined whether or not the driving state of the driver is proper according to the lateral deviation behavior quantity. When it is determined that the road on which the vehicle is running is substantially straight or curved with a substantially constant radius of curvature, and it is further determined that the driving state of the driver is not proper, it is determined that the driving state of the driver is abnormal.

The simple regression line as the behavior reference can be obtained with a relatively small quantity of calculation, so that the quantity of calculation can be reduced compared with the prior art apparatus, and the driving state can be monitored without the use of a microcomputer dedicated to the driving state monitoring. As a result, the driving state can be monitored by using a microcomputer provided in another system (e.g., a navigation system), thereby effecting a cost reduction. In the case where the road shape is largely changed, the lateral deviation behavior quantity tends to increase because of the use of the simple regression line as the behavior reference. In consideration of this tendency, the determination of abnormality is performed under the conditions that the road is substantially straight or curved with a substantially constant radius of curvature. Therefore, although the simple regression line is used as the behavior reference, the driving state can be precisely determined.

Preferably, the road shape determining means estimates a radius of curvature of the road on which the vehicle is running and determines the shape of the road according to the estimated radius of curvature and a change rate of the estimated radius of curvature.

Preferably, the lateral deviation behavior quantity calculating means calculates a running locus of the vehicle according to the behavior parameter and the vehicle speed, calculates a lateral deviation of the running locus with respect to the behavior reference, and calculates a maximum amplitude of the lateral deviation during a predetermined time period as the lateral deviation behavior quantity.

As a modification, the lateral deviation behavior quantity calculating means calculates a running locus of the vehicle according to the behavior parameter and the vehicle speed, and calculates the area of a region surrounded by the running locus and the simple regression line as the lateral deviation behavior quantity.

More preferably, the road shape determining means estimates the radius of curvature according to the vehicle speed and a regression coefficient of the simple regression line.

Preferably, the driving state determining means sets a threshold for use in determining whether or not the driving state is proper, according to the vehicle speed.

More preferably, the driving state determining means sets a threshold for use in determining whether or not the driving state is proper, according to the vehicle speed and the estimated radius of curvature.

As a modification, the driving state determining means calculates a statistic including at least a mean value from a plurality of measured data of the lateral deviation behavior quantity, and sets a threshold for use in determining whether or not the driving state is proper, according to the calculated statistic.

Preferably, the driving state determining means determines whether or not the driver intends to make a lane change, and when the driving state determining means determines that the driver does not intend to make the lane change and that the driving state is not proper, it is determined that the driving state is abnormal.

Other objects and features of the invention will be more fully understood from the following detailed description and appended claims when taken with the accompanying drawings.

DETAILED DESCRIPTION OF THE PREFERRED EMBODIMENTS

Some preferred embodiments of the present invention will now be described with reference to the drawings.
(First Preferred Embodiment)

Figure 1:
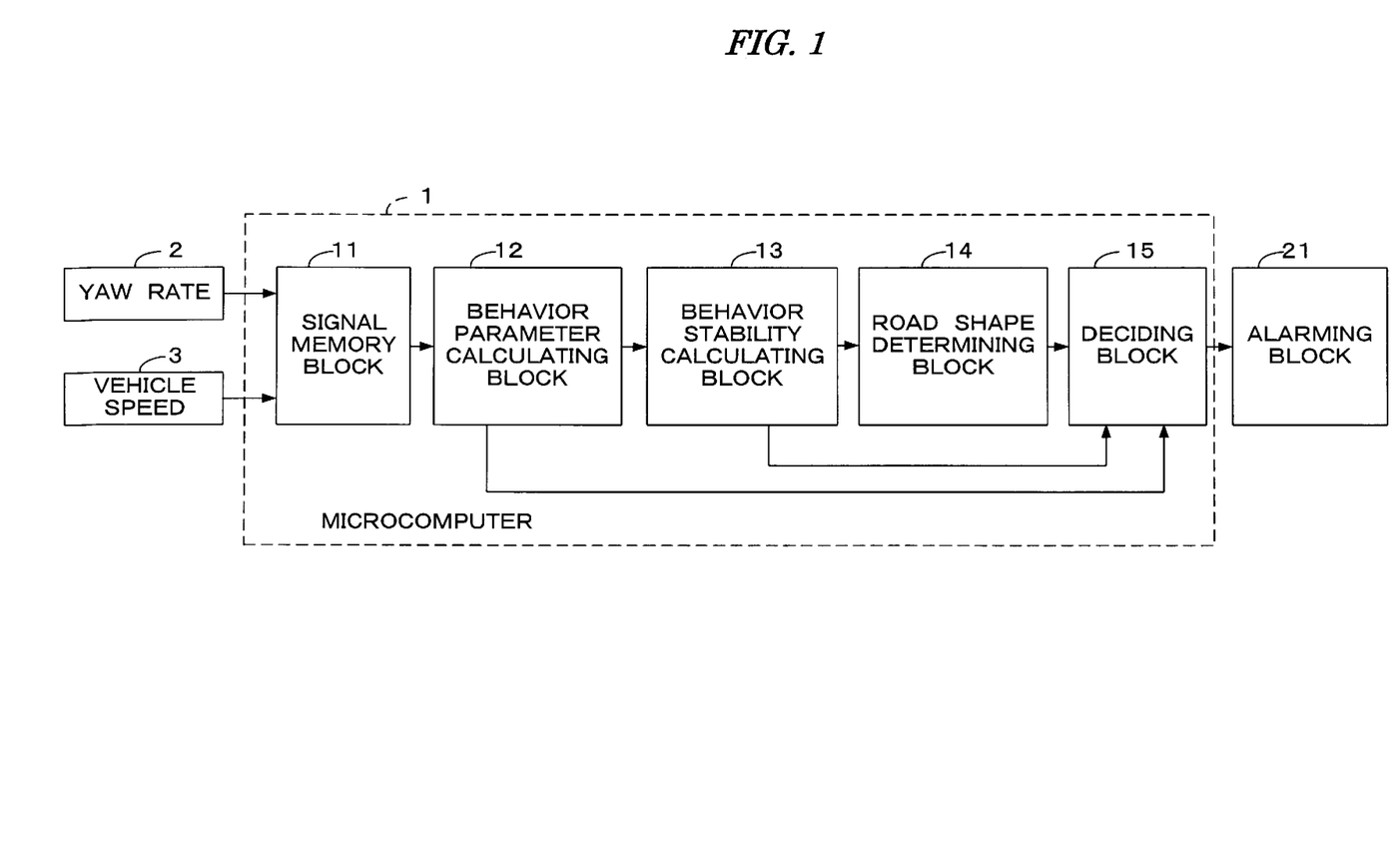
FIG. 1 is a block diagram showing the configuration of a driving state monitoring apparatus according to a first preferred embodiment of the present invention.

FIG. 1 is a block diagram showing the configuration of a driving state monitoring apparatus according to a first preferred embodiment of the present invention. This apparatus is mounted on a vehicle driven by a prime mover such as an internal combustion engine or an electric motor, and has a steering device. In FIG. 1, reference numeral 1 generally denotes a microcomputer. A yaw rate sensor 2 for detecting a yaw rate YR of the vehicle and a vehicle speed sensor 3 as vehicle speed detecting means for detecting a running speed (vehicle speed) V of the vehicle, are connected to the input of the microcomputer 1. Further, an alarming block 21 for issuing an alarm as required during monitoring of the driving state of the driver, is connected to the output of the microcomputer 1. The alarming block 21 includes a lamp, buzzer, or voice generator, for example.

The microcomputer 1 has functions which are represented as functional blocks in FIG. 1, i.e. a signal memory block 11, behavior parameter calculating block 12, behavior stability calculating block 13, road shape determining block 14, and deciding block 15.

The signal memory block 11 stores input signals from the yaw rate sensor 2 and the vehicle speed sensor 3, updates yaw rate data and vehicle speed data stored over a predetermined time period T1 (e.g., 10 seconds) preceding the present time at regular time intervals T2 (e.g., 5 seconds), and outputs the updated data to the behavior parameter calculating block 12.

Figure 3A:
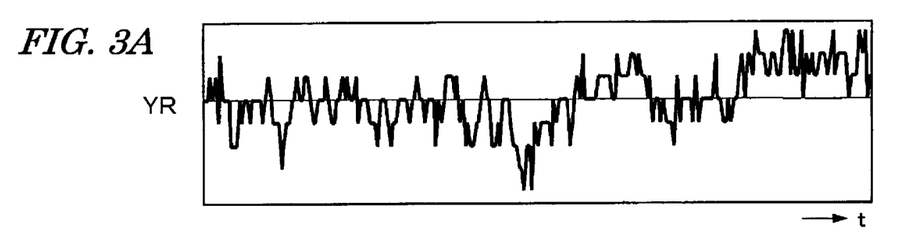
FIGS. 3A to 3D are charts showing an example of changes in yaw rate of a vehicle and in parameters calculated from the yaw rate.
Figure 3B:
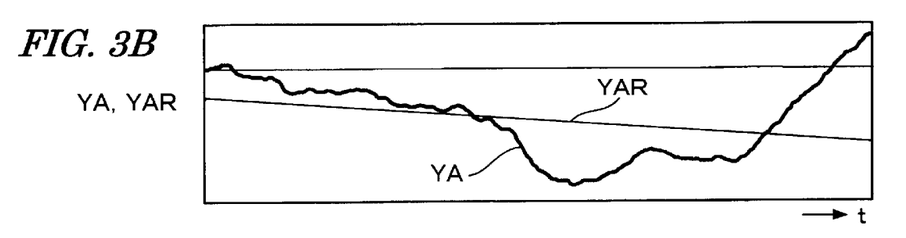

The behavior parameter calculating block 12 integrates the inputted yaw rate YR (see FIG. 3A) with respect to time and converts it into a yaw angle YA (see FIG. 3B). That is, this preferred embodiment employs a yaw angle YA as a behavior parameter indicative of a quantity of lateral movement of the vehicle. The yaw angle YA obtained in the behavior parameter calculating block 12 is inputted into the behavior stability calculating block 13. The behavior parameter calculating block 12 also calculates a mean vehicle speed Vm during the time period T1 from the inputted vehicle speed V, and outputs the calculated mean vehicle speed Vm to the behavior stability calculating block 13 and the deciding block 15.

The behavior stability calculating block 13 obtains a simple regression line as a behavior reference of the vehicle according to the input yaw angle YA (i.e., obtains constants a and b in an expression of YAR=a·t+b to be hereinafter described), calculates a modified yaw angle YAW with reference to the simple regression line, calculates a running locus LOC (x(i), y(i)) of the vehicle by using the modified yaw angle YAW and the mean vehicle speed Vm, and finally calculates a maximum fluctuation width LOCWIDTH of the running locus LOC in the lateral direction (y direction) as a lateral deviation behavior quantity, indicative of the stability of behavior of the vehicle.

More specifically, assuming that yaw angle data of YA(1), YA(2), ..., YA(i), ..., YA(n) are obtained at the times t(1), t(2), ..., t(i), ..., t(n), respectively, a simple regression coefficient a and a constant b of the simple regression line are calculated from Eqs. (1) and (2) to obtain the simple regression line.

$$a = \frac{\sum_{i=1}^{n} t(i)YA(i) - \sum_{i=1}^{n} t(i) \sum_{i=1}^{n} YA(i)}{\sum_{i=1}^{n} t(i)^2 - \left(\sum_{i=1}^{n} t(i)\right)^2} \quad (1)$$

$$b = YAmean - a \cdot tmean \quad (2)$$

$$tmean = \sum_{i=1}^{n} t(i)/n$$

$$YAmean = \sum_{i=1}^{n} YA(i)/n$$

where "tmean" and "YAmean" represent mean values of the times t(i) and the yaw angles YA(i), respectively.

Letting YAR denote the yaw angle YA on the simple regression line, Eq. (3) is given (see FIG. 3B).

$$YAR = a \cdot t + b \quad (3)$$

Figure 3C:
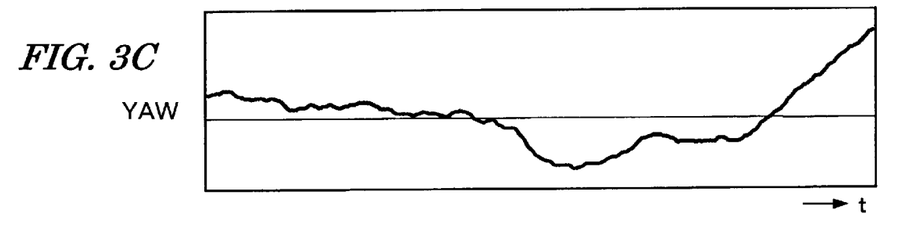

Subsequently, a yaw angle with reference to the simple regression line, i.e., a modified yaw angle YAW=(YA−YAR), is calculated (see FIG. 3C).

Figure 3D:
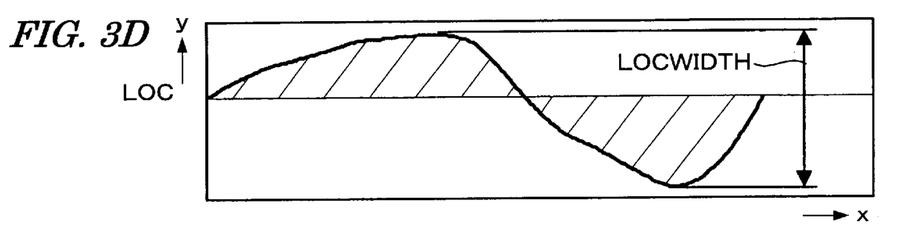

Subsequently, the modified yaw angle YAW and the mean vehicle speed Vm are applied to Eqs. (4) and (5) to obtain a running locus LOC(x(i), y(i)) (see FIG. 3D).

$$x(i)=\int (Vm \times \cos(YAW(i)))dt \qquad (4)$$

$$y(i)=\int (Vm \times \sin(YAW(i)))dt \qquad (5)$$

Subsequently, the maximum fluctuation width LOCWIDTH of the running locus LOC in the lateral direction (y direction) is output as a lateral deviation behavior quantity indicative of the stability of behavior of the vehicle, to the deciding block 15. The behavior stability calculating block 13 also outputs the mean vehicle speed Vm and the simple regression coefficient a to the road shape determining block 14.

The road shape determining block 14 determines the shape of a road on which the vehicle is running, according to the mean vehicle speed Vm and the simple regression coefficient a. More specifically, letting Vm(k) and a(k) denote the k-th input mean vehicle speed Vm and the k-th calculated simple regression coefficient a, respectively, an estimated radius of curvature R is calculated by applying Vm(k) and a(k) to Eq. (6).

$$R=Vm(k)/|a(k)| \qquad (6)$$

According to Eq. (6), when the absolute value of the simple regression coefficient a becomes larger, the slope of the simple regression line becomes larger, i.e., the curvature of the road becomes larger, and accordingly the estimated radius of curvature R becomes smaller. On the other hand, when the mean vehicle speed Vm becomes larger, the estimated radius of curvature R becomes larger.

Subsequently, a change rate RR(k) of the estimated radius of curvature R(k) is calculated from Eq. (7).

$$RR(k)=|R(k)-R(k-1)|/R(k) \qquad (7)$$

If the estimated radius of curvature R(k) is greater than or equal to a straight line determination threshold RLIM, that is, if it is determined that the road is substantially straight, or if the estimated radius of curvature R(k) is less than the straight line determination threshold RLIM and the change rate RR(k) is less than or equal to a constant curve determination threshold RRLIM as a criterion of determination whether the estimated radius of curvature R(k) is substantially constant, a determination enabling signal for enabling the determination of abnormality of the driving state is output to the deciding block 15.

In this preferred embodiment, the reference line as a reference of determination, is approximated by a simple regression line. Accordingly, in the case that the road shape changes substantially, improper determination is prone to occur. To cope with this problem, in the case that the road is curved and the change rate RR of the estimated radius of curvature R of the road is large, the determination of abnormality is inhibited to thereby allow accurate determination. The straight line determination threshold RLIM and the constant curve determination threshold RRLIM are experimentally decided so that the decision in the deciding block 15 to be hereinafter described does not become improper.

In the case where the determination enabling signal from the road shape determining block 14 is input to the deciding block 15, and the maximum fluctuation width LOCWIDTH is greater than or equal to a determination threshold LOCLIM, and where no lane change has been made, the deciding block 15 determines that the driving state is abnormal and then outputs an alarm instruction signal to the alarming block 21.

The determination threshold LOCLIM is experimentally set as follows. Firstly, a maximum fluctuation width LOCWIDTHNR during normal driving and a maximum fluctuation width LOCWIDTHAB during abnormal driving are obtained according to yaw angles YA detected in simulating normal driving and abnormal driving. Then the determination threshold LOCLIM is set so that the relation of LOCWIDTHNR>LOCLIM>LOCWIDTHAB is satified. In consideration of the fact that the maximum fluctuation width LOCWIDTH changes with changes in the vehicle speed V, the determination threshold LOCLIM is set by using Eq. (8), for example, such that the larger the determination threshold LOCLIM increases as the mean value Vm of the detected vehicle speeds V becomes larger.

$$LOCLIM=\alpha \cdot Vm+\beta \qquad (8)$$

where $\alpha$ is a positive constant and $\beta$ is a constant greater than or equal to 0.

Figure 4:
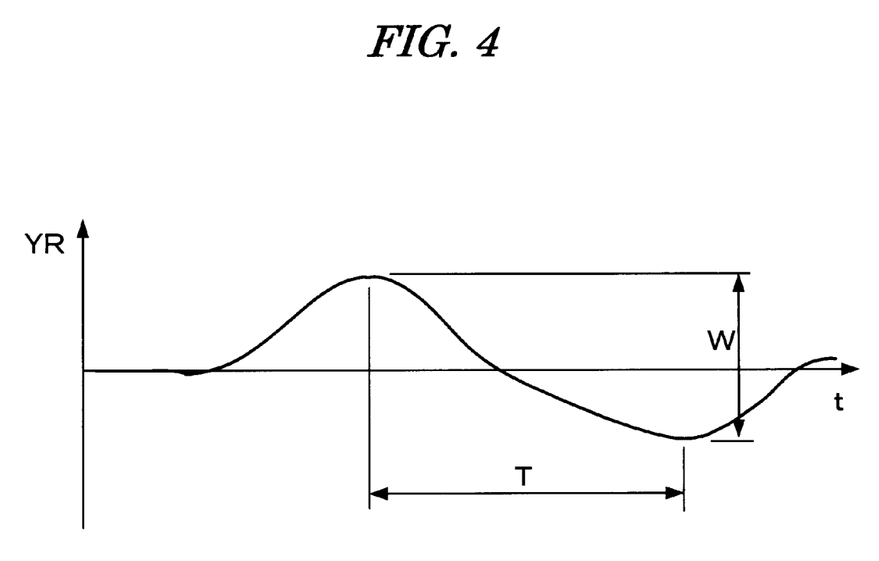
FIG. 4 is a time chart showing changes in the yaw rate in the case of making a lane change.

The determination whether or not the lane change has been made is performed in the following manner. It is known that the yaw rate YR changes with time as shown in FIG. 4 when the lane change has been made. Accordingly, a time period T from the time when the yaw rate YR shows a peak in one direction (e.g., rightward direction) to the time when the yaw rate YR shows a peak in the other direction (e.g., leftward direction) is measured, and a difference W between these peaks (amplitude of the yaw rate) is also measured. In the case where the time period T is in the range between predetermined time periods T1 and T2 (T1>T2) and the amplitude W is larger than a predetermined value W0, it is determined that the lane change has been made. The predetermined time periods T1 and T2 and the predetermined value W0 are experimentally set by actually making the lane change and measuring the yaw rate YR.

As described above, a yaw angle YA is calculated from a detected yaw rate YR, and a simple regression line is obtained by using a plurality of yaw angles YA(i) detected during a monitoring time period T1 and a plurality of times t(i) (i=1 to n). Then, the driving state is determined by using the simple regression line as a reference line (behavior reference). Accordingly, as compared with the conventional method of calculating the reference line with the degree being increased until the regression error becomes less than or equal to a predetermined value (Japanese Patent Laid-open No. Hei 8-249600), the quantity of calculation can be reduced to allow the monitoring of the driving state without the need for a microcomputer dedicated to the monitoring of the driving state. As a result, the driving state can be monitored by using a microcomputer provided in another system (e.g., navigation system), thereby effecting a cost reduction. Further, the road shape is also determined and in the case where an improper determination is prone to occur, i.e., in the case where the road is curved and the change rate RR of the estimated radius of curvature R of the curved road is large, the determination of abnormality is not performed. Accordingly, a precise determination can be performed in spite of the use of the simple regression line as a reference line.

Figure 2:
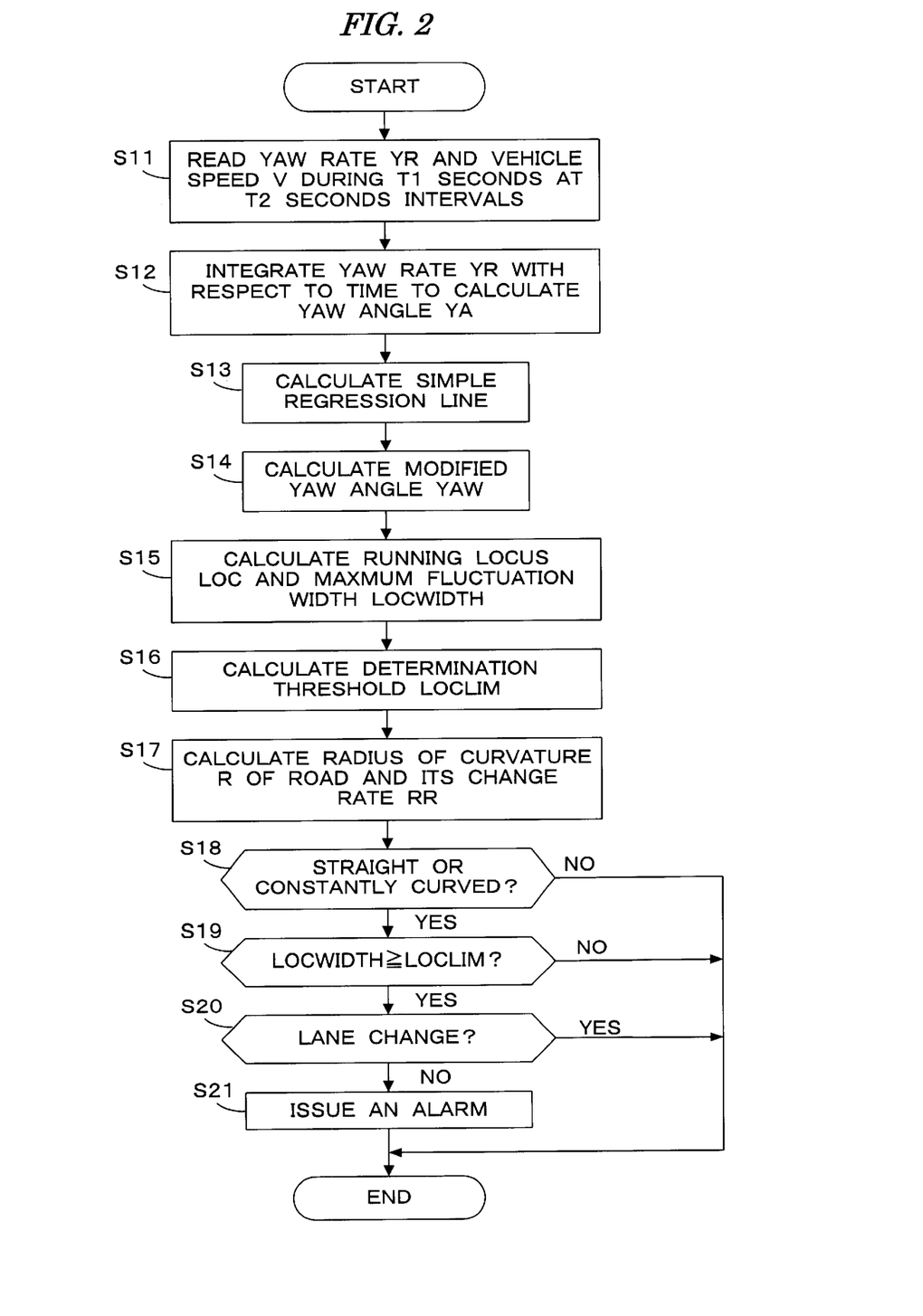
FIG. 2 is a flowchart showing a program for realizing the functions of blocks shown in FIG. 1.

FIG. 2 is a flowchart showing a program to be executed by the microcomputer 1. More specifically, the functions of the behavior parameter calculating block 12, the behavior stability calculating block 13, the road shape determining block 14, and the deciding block 15 are realized by the processing shown in FIG. 2 which is executed by a CPU included in the microcomputer 1.

In step S11, the yaw rate YR and the vehicle speed V during T1 seconds are read at T2 seconds intervals. The yaw rate YR is next integrated with respect to time to thereby calculate the yaw angle YA (step S12). Subsequently, the time-series data of the yaw angle YA, i.e., the times t(i) and the corresponding yaw angles YA(i) are applied to Eqs. (1) and (2) to obtain the simple regression line, i.e., calculate the simple regression coefficient a and the constant b (step S13).

Subsequently, the modified yaw angle YAW=(YA−YAR) is calculated in step S14, and the mean vehicle speed Vm and the modified yaw angle YAW are applied to Eqs. (4) and (5) to calculate the running locus LOC (x(i), y(i)) and its maximum fluctuation width LOCWIDTH (step S15). In step S16, the determination threshold LOCLIM is set according to the mean vehicle speed Vm by using Eq. (8), for example. In step S17, the estimated radius of curvature R of the road and its change rate RR are calculated by using Eqs. (6) and (7).

Subsequently, it is determined whether the road shape is substantially straight or curved with the estimated radius of curvature R being substantially constant, according to the estimated radius of curvature R and its change rate RR. More specifically, it is determined whether or not the estimated radius of curvature R is greater than or equal to the straight line determination threshold RLIM, or whether or not the estimated radius of curvature R is less than RLIM and the change rate RR is less than or equal to the constant curve determination threshold RRLIM (step S18). If the answer in step S18 is negative (NO), that is, if the road shape is not straight or not constantly curved, this program is ended at once to avoid improper determination.

In contrast, if $R \geq RLIM$ or if $R < RLIM$ and $RR \leq RRLIM$, that is, if the road shape is substantially straight or curved with a substantially constant radius of curvature, it is then determined whether or not the maximum fluctuation width LOCWIDTH is greater than or equal to the determination threshold LOCLIM (step S19). If LOCWIDTH<LOCLIM, it is determined that the driving state is proper, and the program is ended. If LOCWIDTH≧LOCLIM, it is then determined whether or not a lane change has been made (step S20). If no lane change has been made, it is determined that the driving state is abnormal, and an instruction of issuing an alarm is given to the alarming block 21 (step S21).

FIGS. 3A and 3B are time charts showing an example of changes in yaw rate YR and yaw angle YA obtained by integrating the yaw rate YR with respect to time, respectively. FIG. 3B also shows the simple regression line (YAR) obtained by the calculation. FIG. 3C shows changes in modified yaw angle YAW with reference to the simple regression line shown in FIG. 3B. FIG. 3D shows a running locus LOC calculated from the modified yaw angle YAW and the mean vehicle speed Vm.

In this preferred embodiment, the yaw rate sensor 2 and the behavior parameter calculating block 12 (steps S11 and S12 in FIG. 2) correspond to the behavior parameter detecting means, the behavior stability calculating block 13 (steps S13, S14, and S15 in FIG. 2) corresponds to the behavior reference setting means and the lateral deviation behavior quantity calculating means, the road shape determining block 14 (steps S17 and S18 in FIG. 2) corresponds to the road shape determining means, and the deciding block 15 (steps S19 and S20 in FIG. 2) corresponds to the driving state determining means.

Figure 5:
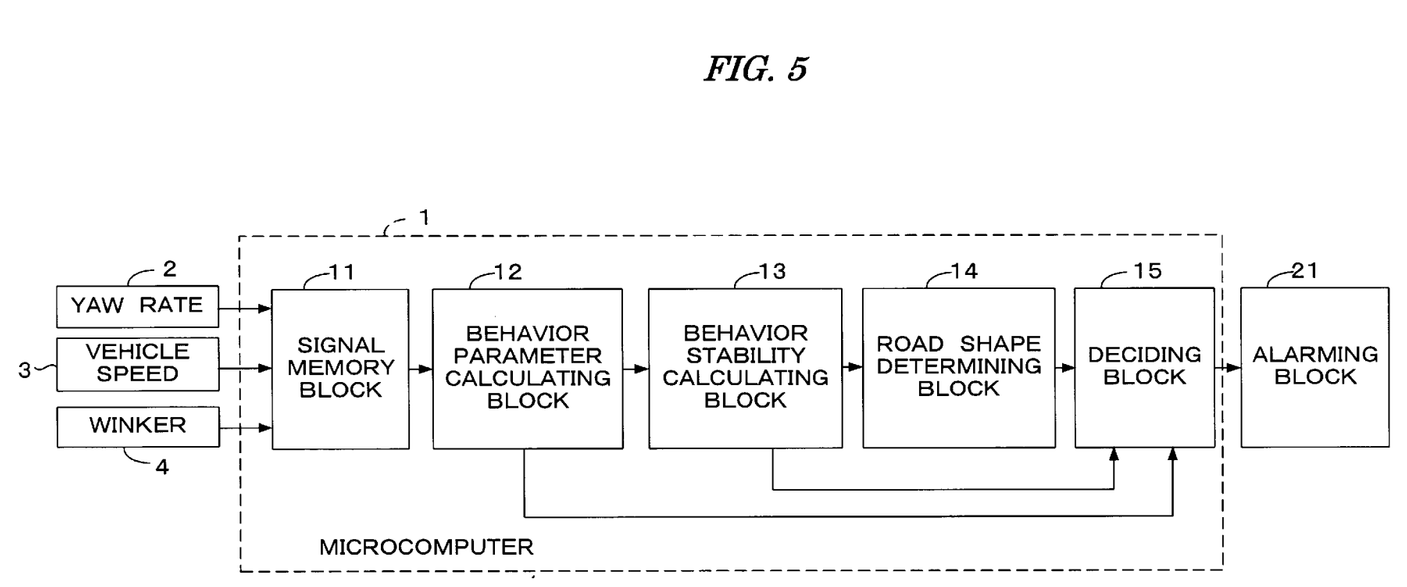
FIG. 5 is a block diagram showing a modification of the configuration shown in FIG. 1.

As a modification of the first preferred embodiment, an output from a winker switch 4 may be further supplied to the microcomputer 1 as shown in FIG. 5, and the determination whether or not a lane change has been made (step S20 in FIG. 2) may be performed according to the output from the winker switch 4.

(Second Preferred Embodiment)

Figure 6:
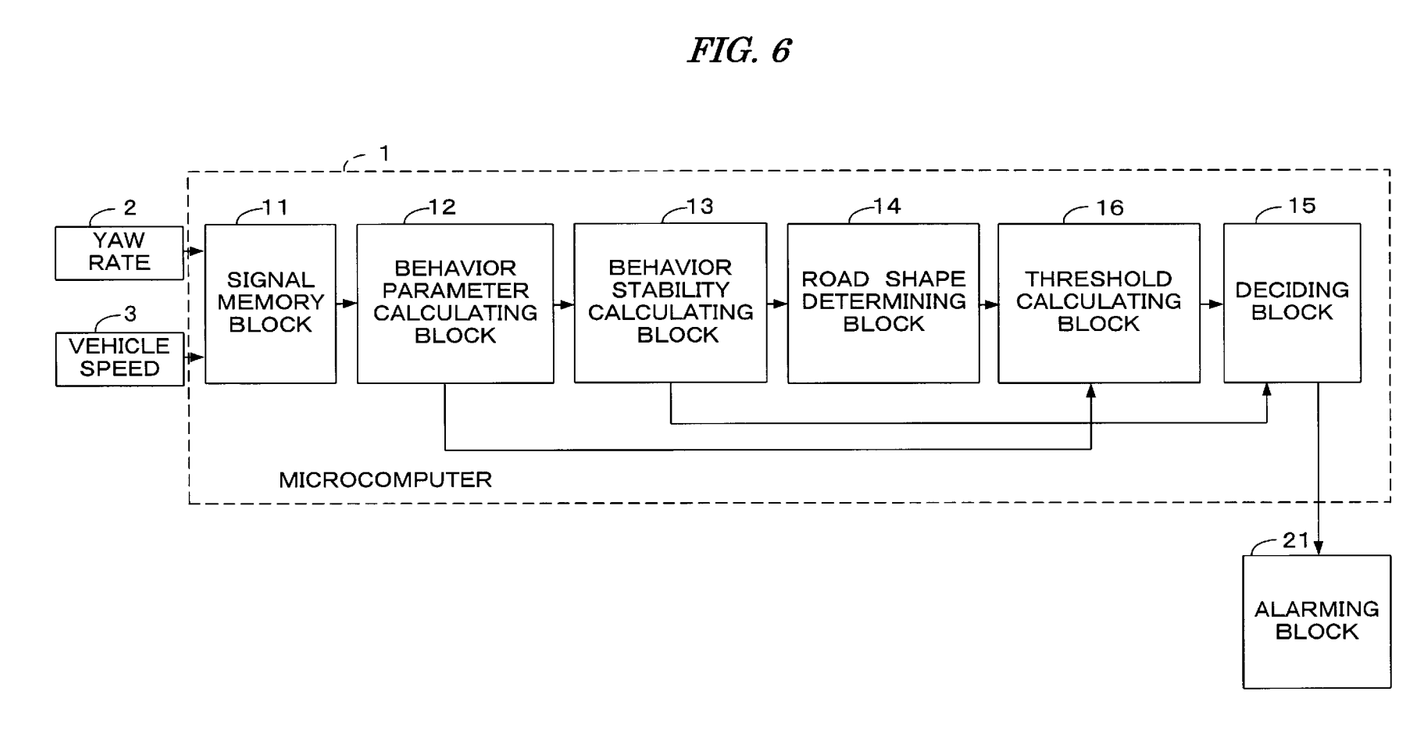
FIG. 6 is a block diagram showing the configuration of a driving state monitoring apparatus according to a second preferred embodiment of the present invention.

FIG. 6 is a block diagram showing the configuration of a driving state monitoring apparatus according to a second preferred embodiment of the present invention. The second preferred embodiment shown in FIG. 6 differs from the first preferred embodiment shown in FIG. 1 in the point that a threshold calculating block 16 is provided between the road shape determining block 14 and the deciding block 15.

The threshold calculating block 16 receives the mean vehicle speed Vm from the behavior parameter calculating block 12 and the estimated radius of curvature R of the road from the road shape determining block 14, and calculates the determination threshold LOCLIM according to the mean vehicle speed Vm and the estimated radius of curvature R received. The calculated determination threshold LOCLIM is supplied to the deciding block 15.

Figure 7:
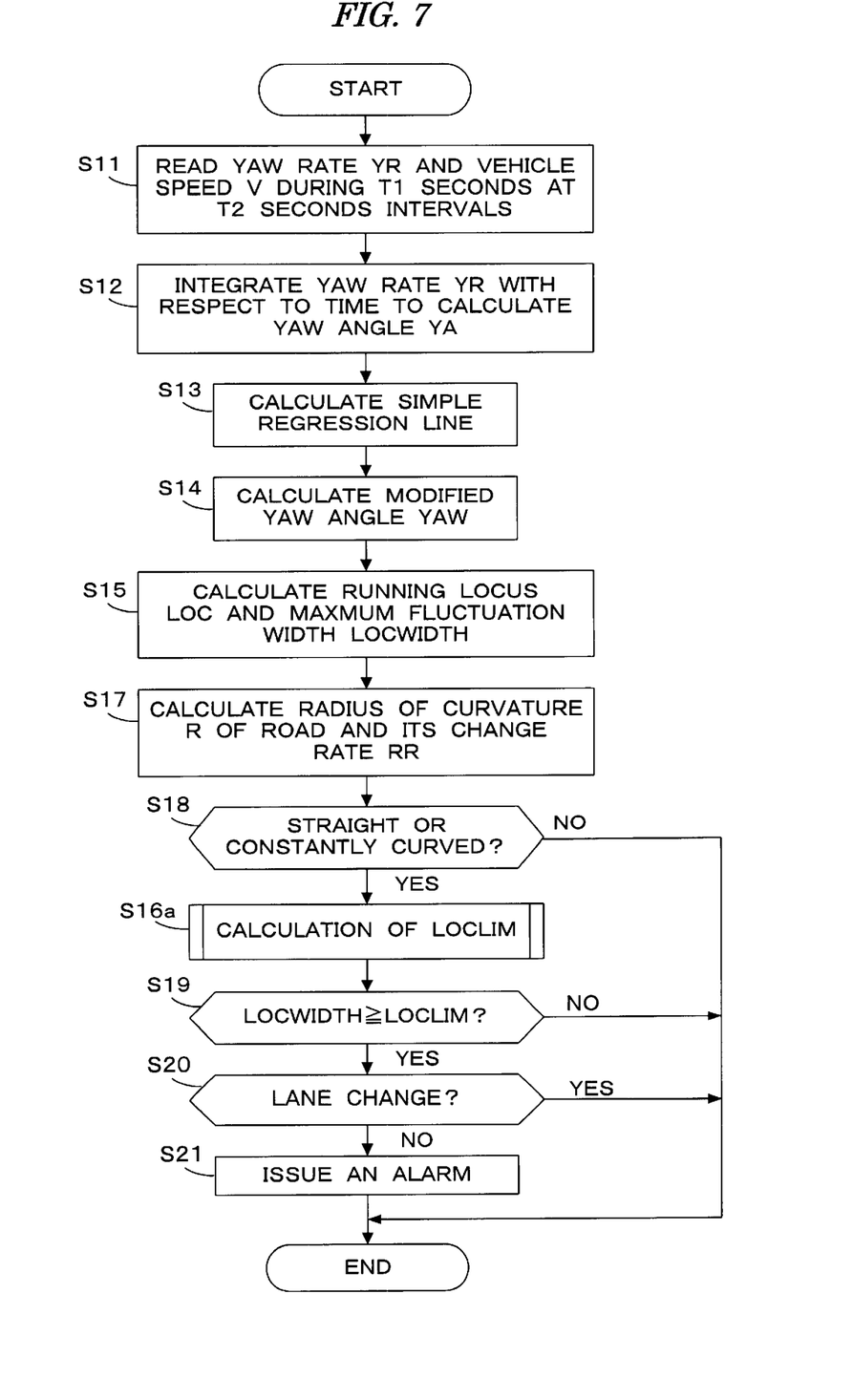
FIG. 7 is a flowchart showing a program for realizing the functions of blocks shown in FIG. 6.
Figure 8:
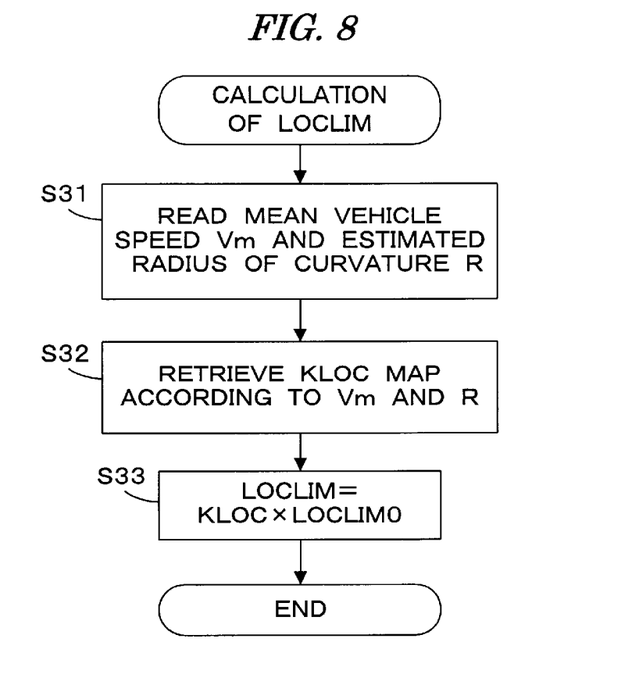
FIG. 8 is a flowchart showing a program for calculating a determination threshold (LOCLIM)

FIGS. 7 and 8 are flowcharts showing programs to be executed by the microcomputer 1 according to the second preferred embodiment. The function of the threshold calculating block 16 in addition to the functions of the behavior parameter calculating block 12, the behavior stability calculating block 13, the road shape determining block 14, and the deciding block 15 as described in the first preferred embodiment, are realized by the processings of FIGS. 7 and 8 executed by the CPU of the microcomputer 1.

The processing of FIG. 7 is the same as the processing of FIG. 2 except that step S16 in FIG. 2 is changed to step S16a and step S16a is inserted between steps S18 and S19.

That is, if it is determined in step S18 that the road shape is substantially straight or constantly curved, the LOCLIM calculation processing shown in FIG. 8 is executed and the program then proceeds to step S19.

Figure 9:
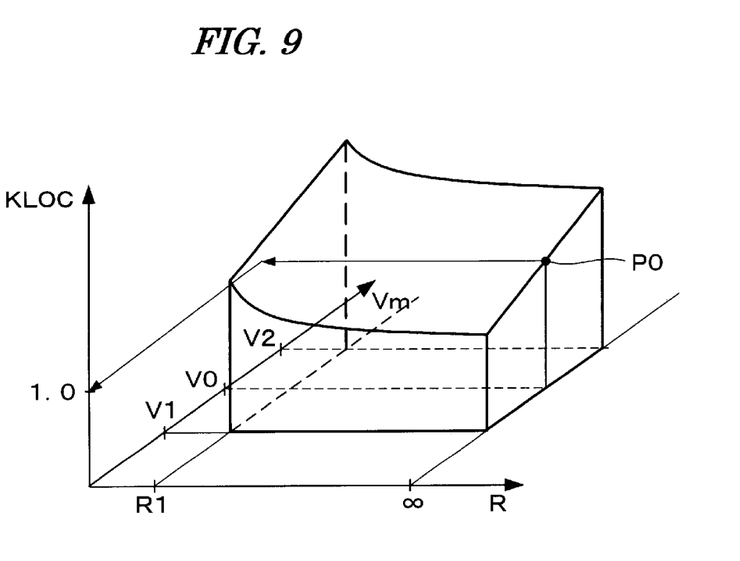
FIG. 9 is a graph showing a map used in the processing of FIG. 8.

FIG. 8 is a flowchart showing a program for calculating the determination threshold LOCLIM to be referred in step S19. In step S31, the mean vehicle speed Vm and the estimated radius of curvature R are read. Thereafter, a KLOC map shown in FIG. 9 is retrieved according to the mean vehicle speed Vm and the estimated radius of curvature R, to calculate a correction coefficient KLOC (step S32). The KLOC map is set so that the correction coefficient KLOC is equal to 1.0 (noncorrective value) at an operating point P0 where the mean vehicle speed Vm is a predetermined vehicle speed V0 (e.g., 100 km/h) and the road shape is straight (R=∞), and that the correction coefficient KLOC increases with an increase in the mean vehicle speed Vm or with a decrease in the radius of curvature R. Further, if the estimated radius of curvature R is smaller than a predetermined radius of curvature R1 or if the mean vehicle speed Vm is higher than a predetermined vehicle speed V2 or lower than a predetermined vehicle speed V1, the determination of the driving state is not performed.

Subsequently in step S33, the determination threshold LOCLIM is calculated from Eq. (9).

$$LOCLIM = KLOC \times LOCLIM0 \qquad (9)$$

where LOCLIM0 is a reference threshold (e.g., 0.5 m) corresponding to the operating point P0 shown in FIG. 9.

The determination threshold LOCLIM calculated above is used for the determination in step S19 shown in FIG. 7, thereby allowing proper determination according to the mean vehicle speed Vm and the road shape (the radius of curvature R). As a result, it is possible to prevent undue alarming or conversely a delay in alarming.

Figure 10:
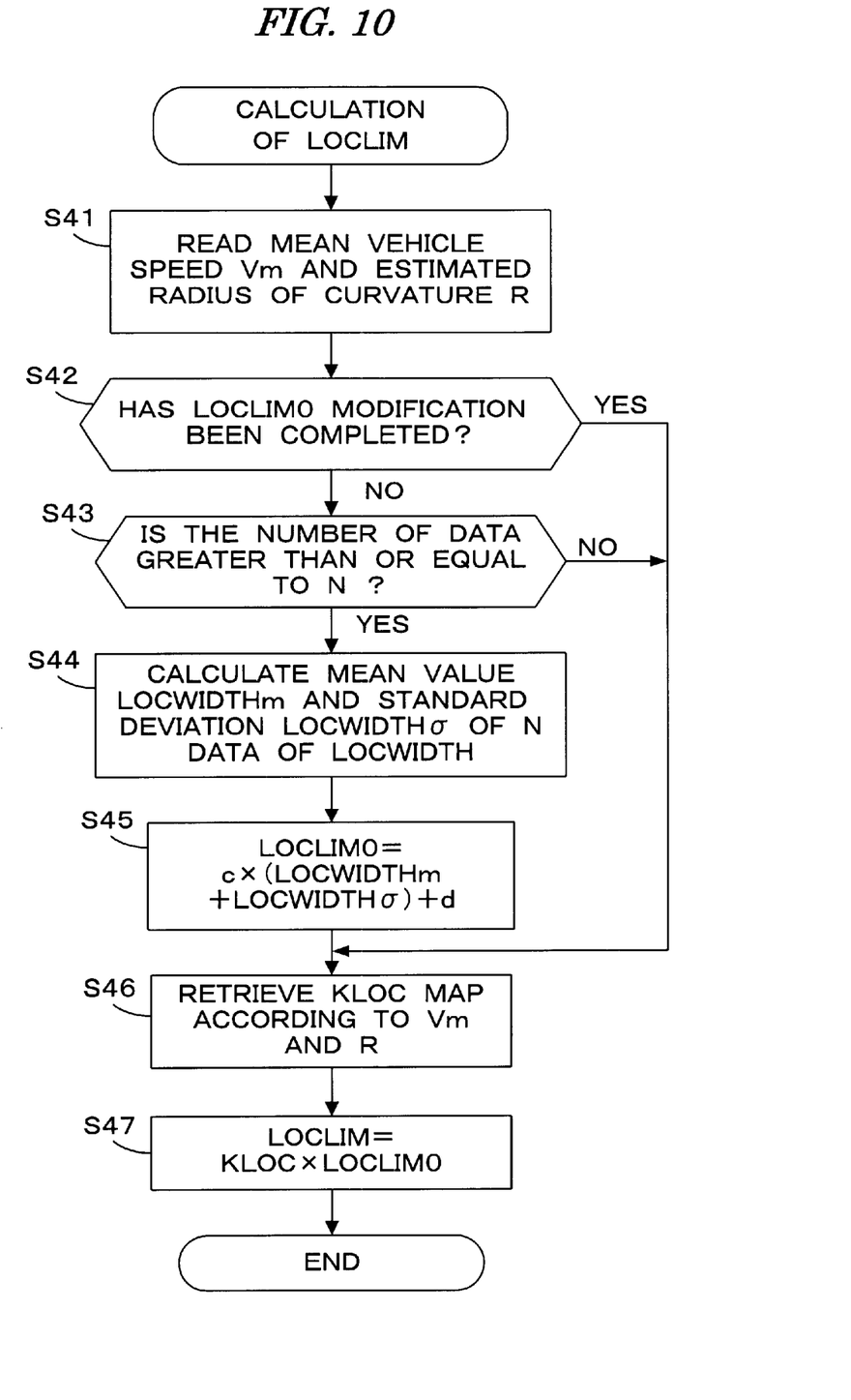
FIG. 10 is a flowchart showing a modification of the processing of FIG. 8.

FIG. 10 is a flowchart showing a modification of the LOCLIM calculation processing shown in FIG. 8. Steps S41, S46, and S47 in FIG. 10 are the same as steps S31, S32, and S33 in FIG. 8, respectively. In this modification, the reference threshold LOCLIM0 is set according to a mean value LOCWIDTHm and a standard deviation LOCWIDTHσ of a plurality of maximum fluctuation widths LOCWIDTH measured during normal driving. Measured data of the maximum fluctuation width LOCWIDTH to be used in calculation of the mean value and the standard deviation is preliminarily stored in the memory.

In step S42, it is determined whether or not modification of the reference threshold LOCLIM0 has been completed. Initially, the answer to step S42 is negative (NO), so that it is then determined whether or not the number of the measured data of the maximum fluctuation width LOCWIDTH has reached a predetermined number N (e.g., 20) or more (step S43). Initially, the answer to step S43 is negative (NO), so that the program proceeds directly to step S46, in which the correction coefficient KLOC is calculated. Subsequently, the determination threshold LOCLIM is calculated from Eq. (9) mentioned above. At this time, an initial value (e.g., 0.5 m) is used as the reference threshold LOCLIM0.

If the number of the measured data becomes N in step S43, the mean value LOCWIDTHm and the standard deviation LOCWIDTHσ of the N measured data of the maximum fluctuation width LOCWIDTH are calculated (step S44), and the reference threshold LOCLIM0 is then modified in accordance with Eq. (10) (step S45).

$$LOCLIM0 = c \times (LOCWIDTHm + LOCWIDTH\sigma) + d \quad (10)$$

where c and d are constants, and Eq. (10) is an equation obtained by experiment, in which the constant c is set to 0.73 and the constant d is set to 0.2 (m), for example.

Once the modification of the reference threshold LOCLIM0 has been completed by executing the steps S44 and S45, the program proceeds from step S42 directly to step S46.

According to the modification shown in FIG. 10, the reference threshold LOCLIM0 is modified according to the mean value LOCWIDTHm and the standard deviation LOCWIDTHσ of the N maximum fluctuation widths LOCWIDTH measured during normal driving, and the determination threshold LOCLIM is calculated by using this modified reference threshold LOCLIM0. Accordingly, it is possible to set the determination threshold suitable for the maximum fluctuation width LOCWIDTH during normal driving which width varies with the driving manner of the driver, thereby allowing more precise determination of the driving state.

In this preferred embodiment, the yaw rate sensor 2 and the behavior parameter calculating block 12 (steps S11 and S12 in FIG. 7) correspond to the behavior parameter detecting means, the behavior stability calculating block 13 (steps S13, S14, and S15 in FIG. 7) corresponds to the behavior reference setting means and the lateral deviation behavior quantity calculating means, the road shape determining block 14 (steps S17 and S18 in FIG. 7) corresponds to the road shape determining means, and the deciding block 15 (steps S16a, S19, and S20 in FIG. 7 and the processing of FIG. 8) corresponds to the driving state determining means.

The present invention is not limited to the above preferred embodiments, but various modifications may be made. For example, while each of the above preferred embodiments employs the maximum fluctuation width LOCWIDTH of the running locus LOC as the lateral behavior quantity indicative of the stability of vehicle behavior, the area of a region hatched in FIG. 3D (the area of a region surrounded by the running locus LOC and a straight line passing through the running locus LOC at its nearly central position) may be used in place of the maximum fluctuation width LOCWIDTH.

Further, while the determination of the road shape is performed by using the estimated radius of curvature R and its change rate RR in each of the above preferred embodiments, the reciprocal of the estimated radius of curvature or the absolute value of the simple regression coefficient a may be used as a road shape determination parameter PR. In this case, the road shape determination parameter PR increases as the curvature of the road becomes larger. Accordingly, if the value of PR is less than or equal to a straight line determination threshold PRLIM, it is determined that the road shape is substantially straight, whereas if the change rate RPR of the road shape determination parameter PR is less than or equal to a constant curve determination threshold RRLIM, it is determined that the road shape is curved with a substantially constant radius of curvature.

Further, while the second preferred embodiment employs the mean value LOCWIDTHm and the standard deviation LOCWIDTHσ of the N maximum fluctuation widths LOCWIDTH as statistic quantity for the calculation of the reference threshold LOCLIM0, the standard deviation may be replaced by a dispersion of the N maximum fluctuation widths LOCWIDTH.

Further, the reference threshold LOCLIM0 may be calculated from Eq. (10a).

$$LOCLIM0 = LOCWIDTHm + c' \times LOCWIDTH\sigma \quad (10a)$$

where c' is a constant experimentally set to a value of about 1 to 2, for example.

As a modification of the second preferred embodiment, an output from a winker switch 4 may be supplied to the microcomputer 1 as in FIG. 5, and the determination whether or not a lane change has been made (step S20 in FIG. 7) may be performed according to the output from the winker switch 4.

Further, in the case of using the maximum fluctuation width LOCWIDTH as a parameter indicative of the stability of vehicle behavior, the calculation of the x coordinates of the running locus LOC is not always required.

Further, while the alarming block 21 in each of the above preferred embodiments is configured so as to appeal to the visual or auditory sense of the driver, any other alarming methods may be adopted such as a method of directly acting on the driver by vibrating a driver's seat or by applying a tension to a seat belt, a method of releasing a specific smell into the compartment, or a method of changing the operating condition of an air conditioner. By adopting such methods, the driver can more reliably know a deterioration in the driving state.

Further, while the yaw rate is detected by the yaw rate sensor 2 in each of the above preferred embodiments, the yaw rate may be calculated by using outputs from a wheel speed sensor and a vehicle speed sensor, or outputs from a steering angle sensor and a lateral acceleration sensor.

Further, in the case that a navigation system is mounted on the vehicle, the information (radius of curvature) indicative of the road shape may be obtained from a present position of the vehicle and map information stored in the navigation system.

The present invention may be embodied in other specific forms without departing from the spirit or essential characteristics thereof The presently disclosed embodiments are, therefore, to be considered in all respects illustrative and not restrictive, the scope of the invention being indicated by the appended claims rather than the foregoing description, and all changes which come within the meaning and range of equivalency of the claims are, therefore to be embraced therein.

What is claimed is:

1. A driving state monitoring apparatus for a vehicle, for monitoring the driving state of a driver of said vehicle, comprising:

behavior parameter detecting means for detecting a behavior parameter indicative of an amount of lateral movement of said vehicle;

vehicle speed detecting means for detecting the vehicle speed of said vehicle;

behavior reference setting means for obtaining a simple regression line according to changes in the behavior parameter and setting the simple regression line as a behavior reference;

lateral deviation behavior quantity calculating means for calculating a lateral deviation behavior quantity of said vehicle according to the behavior parameter, the behavior reference, and the vehicle speed;

driving state determining means for determining whether or not the driving state of the driver is proper according to the lateral deviation behavior quantity; and road shape determining means for determining the shape of the road on which said vehicle is running;

wherein when said road shape determining means determines that the road is substantially straight or curved with a substantially constant radius of curvature, and said driving state determining means determines that the driving state of the driver is not proper, it is determined that the driving state of the driver is abnormal; and wherein said road shape determining means estimates the radius of curvature of the road on which said vehicle is running and determines the shape of the road according to the estimated radius of curvature and a change rate of the estimated radius of curvature.

2. A driving state monitoring apparatus according to claim 1, wherein said lateral deviation behavior quantity calculating means calculates a running locus of said vehicle according to the behavior parameter and the vehicle speed, calculates a lateral deviation of the running locus with respect to the behavior reference, and calculates a maximum amplitude of the lateral deviation during a predetermined time period as the lateral deviation behavior quantity.

3. A driving state monitoring apparatus according to claim 1, wherein said lateral deviation behavior quantity calculating means calculates a running locus of said vehicle according to the behavior parameter and the vehicle speed, and calculates the area of a region surrounded by the running locus and the simple regression line as the lateral deviation behavior quantity.

4. A driving state monitoring apparatus according to claim 1, wherein said road shape determining means estimates the radius of curvature according to the vehicle speed and a regression coefficient of the simple regression line.

5. A driving state monitoring apparatus according to claim 1, wherein said driving state determining means sets a threshold for determining whether or not the driving state is proper, according to the vehicle speed.

6. A driving state monitoring apparatus according to claim 1, wherein said driving state determining means sets a threshold for use in determining whether or not the driving state is proper, according to the vehicle speed and the estimated radius of curvature of the road.

7. A driving state monitoring apparatus according to claim 1, wherein said driving state determining means calculates a statistic including at least a mean value from a plurality of measured data of said lateral deviation behavior quantity, and sets a threshold for use in determining whether or not said driving state is proper, according to the calculated statistic.

8. A driving state monitoring apparatus according to claim 1, wherein said driving state determining means determines whether or not the driver intends to make a lane change, and when said driving state determining means determines that the driver does not intend to make the lane change and the driving state is not proper, said driving state determining means determines that the driving state is abnormal.

* * * * *